United States Patent

[11] 3,609,086

| [72] | Inventors | Robert J. Modahl<br>Galesville;<br>Paul J. Lynch, La Crosse, both of Wis. |
|---|---|---|
| [21] | Appl. No. | 872,802 |
| [22] | Filed | Sept. 15, 1969 |
| [23] | | Division of Ser. No. 744,913, July 15, 1968. |
| [45] | Patented | Sept. 28, 1971 |
| [73] | Assignee | The Trane Company |

[54] ARSENIC TRIOXIDE CORROSION INHIBITOR FOR ABSORPTION REFRIGERATION SYSTEM
6 Claims, 2 Drawing Figs.

[52] U.S. Cl. .................................................. 252/68,
62/112, 62/114, 62/485, 62/DIG. 20, 252/67, 252/387
[51] Int. Cl. ....................................................... C09k 3/06, C23f 11/18
[50] Field of Search............................................. 252/68, 387; 62/112, 114, 485, DIG. 20; 256/67, 69

[56] References Cited
UNITED STATES PATENTS

| 2,755,170 | 7/1956 | Stubblefield et al. ......... | 62/DIG. 20 |
|---|---|---|---|
| 2,755,635 | 7/1956 | Bourne......................... | 62/485 |
| 3,087,778 | 4/1963 | Negra et al. .................. | 62/DIG. 20 |

*Primary Examiner*—Richard D. Lovering
*Assistant Examiner*—Irwin Gluck
*Attorneys*—Lee E. Johnson, Arthur O. Andersen and Carl M. Lewis

ABSTRACT: Evolution of hydrogen and corrosion of iron and copper construction materials in a closed, substantially anaerobic refrigeration system of an absorption refrigeration machine is successfully controlled by addition of an arsenic trioxide inhibitor to the lithium bromide absorbent solution. The absorbent solution is maintained at a basicity of from 0.1N to 0.5N based on a 60 percent lithium bromide solution.

INVENTOR.
ROBERT J. MODAHL
PAUL J. LYNCH

BY
ATTORNEY

ARSENIC TRIOXIDE CORROSION INHIBITOR FOR ABSORPTION REFRIGERATION SYSTEM

This application is a division of Ser. No. 744,913, filed July 15, 1968.

BACKGROUND OF THE INVENTION

1. Field of the Invention

This invention relates to absorption refrigeration systems and, particularly, to compositions dissolved in an absorption solution to inhibit corrosion of internal metal surfaces of the system.

2. Description of the Prior Art

The working fluids employed in most large commercial absorption refrigeration machines are concentrated lithium bromide solutions as the absorbent and water as the refrigerant. Current single effect machine design utilizes low pressure stream or hot water as the energy source. These machines operate a maximum absorbent solution temperatures of about 250° F.

It is desirable, however, to raise the operating temperatures of the lithium bromide-water absorption cycle to achieve higher efficiency. This is most easily accomplished with a double effect or two-stage generator design. The temperatures reached in the high temperature generator of a double effect machine can be as high as 400° F. The heat source for the high temperature generator is usually high temperature steam, although another common method is to directly fire with gas.

In the past effective corrosion inhibitors have been found for absorbent solutions, but these inhibitors were utilized in systems which contained acidic absorbent solutions or in which there was sufficient free oxygen present to affect corrosive characteristics of the construction materials. It is desirable, however, for optimum operation of absorption refrigeration systems to operate with alkaline absorbent solutions in an anaerobic, or substantially oxygen-free atmosphere. It appears that little or no research has been conducted under the combined alkaline and substantially anaerobic conditions.

SUMMARY OF THE INVENTION

This invention provides a means for inhibiting and controlling corrosion in high temperature, double effect absorption refrigeration systems which comprises an absorber, first and second effect generators, first and second effect condensers, and an evaporator, said absorber, generators, condensers and evaporator forming a closed, substantially anaerobic system. The closed system contains a concentrated, aqueous lithium bromide absorbent salt solution which is maintained at a basic normality of from about 0.1 to about 0.5, preferably from 0.1 to 0.3. The solution further contains an $As_2O_3$ inhibitor in an amount greater than about 200 mg. per liter of solution, preferably from 200 to 2,000 mg. per liter of solution, and more preferably from 200 to 700 milligrams per liter of absorbent solution.

DESCRIPTION OF EMBODIMENTS

Figure 1:
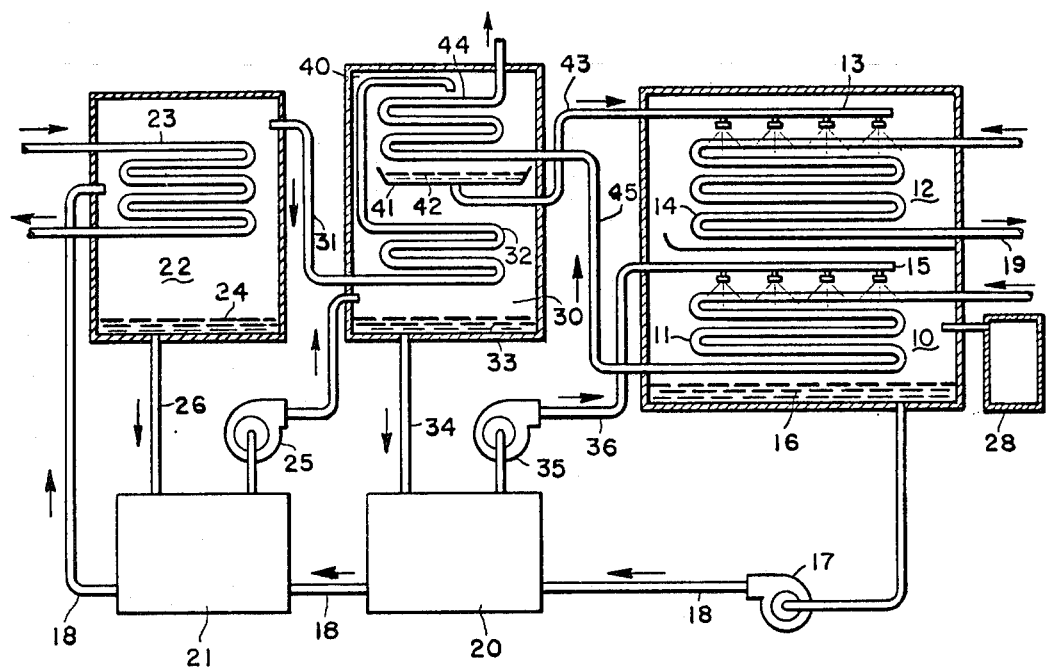
FIG. 1 is a schematic representation of two-stage or double effect absorption refrigeration systems.

FIG. 1 is a simplified schematic representation of an absorption refrigeration machine which contains materials subject to the corrosive effects of a LiBr salt solution. The primary construction material is steel. The heat exchange surfaces are usually manufactured from copper or a copper-nickel alloy. Referring particularly to FIG. 1, absorber section 10 contains a plurality of heat exchange tubes 11. A spray header 15 is located above the absorber section.

An evaporator section 12 is situated in the same enclosure with absorber 10. In the schematic the evaporator includes a spray header 13 to distribute a refrigerant over heat exchange coils 14. The evaporator section 12 and absorber section 10 are in open communication with each other, although in practice baffles are provided to prevent liquid refrigerant entrained in the vapor from carrying over into the absorber section. A recycle means is also usually provided to return unevaporated refrigerant from below the evaporator coils 14 to spray header 13.

A suitable refrigerant, for example, water, is sprayed over coils 12 in the evaporator section and a suitable absorbent solution, for example, aqueous lithium bromide, is sprayed over tubes 11. The refrigerant is vaporized in the evaporator section and passes into the absorber section where the refrigerant vapor is absorbed by the absorbent solution. Vaporization of the refrigerant extracts heat from a heat exchange fluid, usually water, passing through coils 14. This heat is carried with the refrigerant vapor to the absorber where it is released to a cooling fluid passing through tubes 11. The refrigerant evaporation produces a cooling effect on the fluid passing through coils 14.

Dilute absorbent solution 16 is circulated by pump 17 through line 18 to and through a first heat exchanger 20 and a second heat exchanger 21 in which the dilute solution is successively heated before it passes to a first effect generator 22. Steam from a suitable source is introduced through tubes 23 to boil the weak solution, thus driving off water vapor and concentrating the solution. The absorbent solution of intermediate concentration 24 is forced by pump 25 through line 26 into heat exchanger 21 where it gives up a portion of its heat to the dilute solution. From heat exchanger 21, the solution of intermediate concentration passes into a second effect generator 30 which is at a lower pressure than the first effect generator 22.

The refrigerant vapor from the first effect generator passes through line 31 into heat exchange tubes 32 where it transfers its heat of vaporization to the partially concentrated absorbent solution causing the latter to again boil. Thus the absorbent solution of intermediate concentration is converted to a concentrated absorbent solution 33 which is pumped through line 34 into the first heat exchanger 20. From the first heat exchanger, where the concentrated solution transfers heat to weak or dilute absorbent solution, it is pumped by pump 35 via line 36 back to spray header 15 in the absorber section 10.

When the refrigerant vapor from the first effect generator 22 gives up heat of vaporization in tubes 32 to further concentrate the absorbent solution, the refrigerant of course condenses. Thus the second effect generator 30 also functions as a first effect condenser. The refrigerant vapor produced in the second effect generator along with the refrigerant from tubes 32 passes to a second effect condenser 40 in which all of the refrigerant vapor is condensed.

The refrigerant 42 is collected in panlike member 41 and transferred to spray header 13 in the evaporator 12 via line 43. The cooling fluid is supplied to coils 44 in the second effect condenser through line 45 from heat exchange tubes 11 in the absorber 10.

The heat exchange fluid in coils 14 which is cooled by evaporation of refrigerant is passed through line 19 to a suitable distribution system. A cooling fluid, for example, water, is supplied to the tubes 11 in the absorber section 10 from a suitable fluid cooling means such as a cooling tower. The cooling fluid is returned to the cooling tower or similar means from coils 44 of the second effect condenser 40.

A suitable absorbent solution for this refrigeration system is a concentrated, aqueous, hygroscopic lithium bromide solution. During the absorption-concentration cycle, lithium bromide concentration can vary from 46 percent to 65 percent based on the weight of the solution.

Ideally, the above system is completely closed and operates in the absence of air or oxygen. However, it is contemplated that a purge apparatus, shown as 28 in FIG. 1, will be provided to remove air and other noncondensibles as is common in absorption machines of this type. Under normal operating conditions a small amount of air can leak into the system through weld joints or other imperfect fittings. However, the closed system described above does operate under substantially oxygen-free, or substantially anaerobic conditions.

As previously mentioned, the construction materials of the absorption refrigeration machine described above are primarily steel and copper. The control of corrosion in this type of two-stage machine is complicated by a number of corrosion mechanisms which occur simultaneously. Of major importance is the type of corrosion which occurs under anaerobic conditions, that is, in the absence of free oxygen, where the water of the absorbent solution reacts with the iron and steel parts of the machine. Iron is oxidized by the hydrogen ions of the water producing ferrous and ferric ions and hydrogen gas. The noncondensible gas tends to accumulate in the lowest pressure area of the machine, the absorber, reducing the rate of absorption of water so that full refrigeration capacity cannot be sustained. Continued metal corrosion can eventually lead to structural failure. In addition, the iron ions can combine to form solids which can plug spray nozzles and coat metal surfaces and reduce heat transfer rates.

Another corrosion problem involves the thermogalvanic corrosion of copper and copper alloys. The thermogalvanic corrosion mechanism involves the following steps: (1) metallic copper exposed to high temperature lithium bromide solution is oxidized to form soluble cuprous ions; (2) the cuprous ions enter the absorbent solution are distributed throughout the machine as the solution is circulated; (3) the copper oxidation half-reaction occurring at high temperature locations is balanced by a reduction half-reaction involving the plating out of copper ions from solution in low temperature areas.

With respect to the corrosion of iron and steel, it is generally advantageous to maintain the solution on the alkaline side by the addition of hydroxide if necessary. Proper amounts of hydroxyl ion as lithium hydroxide in lithium bromide solutions markedly reduces the rate of iron and steel corrosion. The reduced rate achieved in this manner, however, is still excessive, particularly at the high temperatures required in a double-effect system.

As previously discussed, the lithium bromide solution does not function under isothermal conditions in an absorption refrigeration machine. A typical closed-loop thermal cycle approximates temperatures from 100° F. to 350° F. to 225° F. and back to 100° F. Under such conditions, the thermogalvanic effect causes the corrosion rate to be greater than under isothermal conditions.

EXAMPLES

The following examples are intended to illustrate the instant invention, but they are not to be construed as limiting the scope of the invention.

EXAMPLE I

A series of tests are made in an apparatus comprising two interconnected steel vessels forming a closed system. A 60 percent lithium bromide solution is placed in the system. Steel and 90%–10%/copper-nickel alloy samples are inserted in each of the vessels. These metal samples have sufficient surface area to solution volume ratio to approximate actual absorption refrigeration machine design. A measured amount of corrosion inhibitor is added to the system. The normality is adjusted to the desired level by addition of lithium hydroxide. The normality is based on a 60 percent lithium bromide solution.

The lithium bromide solution is boiled at 350° F. in the high temperature vessel and, by vapor lift, pumped into the second vessel which is maintained at 200° F. The solution is then returned to the high temperature vessel. Residence time in each of the vessels is approximately equal.

Results of the above procedure after maintaining the system for about 672 hours are described in table 1. The inhibitor and normality are varied in accord with the table. The 90–10/c copper-nickel alloy is coded as "Cuni."

TABLE I

| Inhibitor | | | Alkalinity normality | Metal corrosion rate, MPY | | Hydrogen evolved cc./hr. ft.$^2$ of steel at 350° F. |
|---|---|---|---|---|---|---|
| Identity | Concentration, mg./l. | | | Steel at 350° F. | Cuni at 350° F. | |
| | Start | End | | | | |
| None | | | 0.1 | 0.4 | 0.0 | 1.6 |
| As$_2$O$_3$ | 1,000 | 2 | 0.1 | 0.0 | 11.3 | <0.1 |
| As$_2$O$_3$ | 1,000 | 588 | 0.3 | 0.1 | 2.2 | <0.1 |
| Sb$_2$O$_3$ | 1,500 | 431 | 0.1 | 0.3 | 1.5 | <0.1 |

Table 1 compares the results of four nonisothermal tests of inhibitor compositions found effective under isothermal conditions. In the presence of an effective inhibitor for steel, copper-nickel alloy corrodes too rapidly for usage at 350° F. Metal corrosion rates, expressed as mils penetration per year (MPY) in the tables, were calculated from weight loss measurements assuming uniform attack. Without inhibitor, the steel reaction provides anodic protection for the copper-nickel alloy, but allows an intolerable rate of hydrogen evolution.

EXAMPLE II

Another two vessel test is run following the procedure of example I except the high-temperature vessel is held at 400° F. Arsenic trioxide and lithium molybdate inhibitors are contrasted. The results after maintaining the test for about 666 hours are shown in table II.

TABLE II

| Inhibitor | | | Alkalinity normality | Metal corrosion rate, MPY | | Hydrogen evolved cc./hr. ft.$^2$ of steel at 400° F. |
|---|---|---|---|---|---|---|
| Identity | Concentration, mg./l. | | | Steel at 350° F. | Cuni at 200° F. | |
| | Start | End | | | | |
| As$_2$O$_3$ | 1,000 | 660 | 0.1 | 0.1 | 0.1 | <0.1 |
| Li$_2$MoO$_4$ | 2,000 | | 0.1 | 0.2 | 0.0 | 0.6 |

Note that an excessive hydrogen evolution rate persists with lithium molybdate. The lithium molybdate concentration at the end of the run was not analyzed.

EXAMPLE III

The procedure of Example I is repeated using a three vessel apparatus. The solution in the high-temperature vessel is boiled at 400° F., the intermediate temperature vessel is maintained at 225° F., and the low temperature vessel is maintained at 100° F. Only steel samples are placed in the high temperature vessel, steel and 90–10/copper-nickel samples are placed in the intermediate temperature vessel, and steel and pure copper samples are placed in the low temperature vessel.

Results obtained after maintaining the system described above for 1,670 hours are shown in table III.

TABLE III

| Inhibitor | | | Alkalinity normality | Metal corrosion rate, MPY | | Hydrogen evolved cc./hr. ft.$^2$ of steel at 400° F. |
|---|---|---|---|---|---|---|
| Identity | Concentration, mg./l. | | | Steel at 400° F. | Cuni at 225° F. | |
| | Start | End | | | | |
| As$_2$O$_3$ | 1,000 | 665 | 0.3 | 0.0 | 0.0 | <0.1 |
| Sb$_2$O$_3$ | 1,500 | 158 | 0.3 | 0.0 | 0.0 | <0.1 |

Comparing the arsenite and antimonite, metal corrosion and hydrogen evolution rate is satisfactory. In contrast, however, the antimonite has a consumption rate which is unexpectedly much higher than the arsenite.

EXAMPLE IV

The procedure of example III is repeated. The high-temperature vessel is boiled at 350° F., the intermediate-temperature vessel is held at 225° F., and the low-temperature vessel is held at 100° F. Steel samples only are placed in the high temperature vessel, and 90–10/copper-nickel samples are placed in the intermediate and low-temperature vessels. Three runs are made using the $As_2O_3$ inhibitor. The normality of the solution in each run is 0.1, 0.3 and 1.0, respectively.

Figure 2:
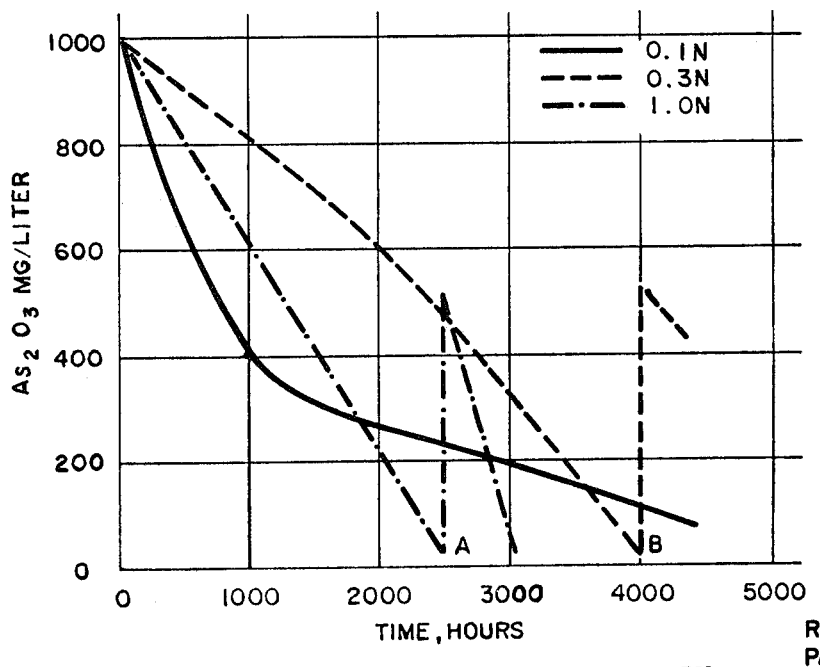
FIG. 2 is a graph showing inhibitor consumption rate as a function of absorbent solution normality.

FIG. 2 illustrates the effect of alkalinity on the performance of arsenite or arsenic trioxide inhibitor. The inhibitor is consumed more rapidly at first in 0.1N solution than at higher alkalinities. Unlike the latter, however, the slope of the 0.1N curve decreases in time indicating it to be a preferred alkalinity for the long term. The elapsed times corresponding to A and B represent the total hours of operation of 1.0 and 0.3N solutions before inhibitor concentration becomes depressed to the point that hydrogen begins evolving at an excessive rate. The inhibitor is consumed at a faster rate and hydrogen evolution begins at a higher inhibitor concentration in 1.0N than in 0.3N solution. Furthermore, addition of 500 mg. per liter of $As_2O_3$ to each of these systems after hydrogen evolution had begun resulted in cessation in the 0.3N solution but not in the 1.0N solution.

GENERAL DESCRIPTION

Inhibitors or other additives generally have a low solubility in a concentrated aqueous lithium bromide solution. Corrosion inhibition theory states that a minimum concentration of inhibitor is required to effect anodic inhibition or passivation. It is believed that many of the other oxyanions tested and found ineffective were not sufficiently soluble. Those materials affording initial protection, such as arsenite, are consumed with time while sustaining the protection. Therefore, a reserve is required. The maximum solubility of these inhibitors in concentrated lithium bromide is less than one gram per liter. Therefore, a long term reserve must either be present in an insoluble form or be provided by periodic makeup charges proportional to the consumption rate. The presence of an insoluble excess can be undesirable because it tends to plug spray nozzles causing operating problems. It was determined that successful operation of an absorption machine can be achieved at arsenite concentrations up to 2,000 mg. per liter of absorbent solution. Below a concentration of 200 mg. per liter excessive hydrogen evolution occurs. Optimum operating range is between 200 mg. per liter and 700 mg. per liter of absorbent solution, the latter figure being near the solubility limit of the arsenite in a concentrated lithium bromide solution.

The preferred operating range of solution normality is from 0.1N to 0.3N although successful operation is achievable at a solution normality up to 0.5N. The normality is measured relative to a 60 percent lithium bromide solution.

From the foregoing disclosure utility for the instant inhibitor composition for use in an absorption refrigeration machine is apparent.

The invention described in this specification is to be limited only by the appended claims.

What is claimed is:

1. An absorbent solution for use in an absorption refrigeration system wherein the system containing the said absorbent solution is closed and substantially anaerobic, the said absorbent solution comprising a concentrated aqueous lithium bromide solution and $As_2O_3$, in an amount sufficient to inhibit corrosion, said lithium bromide solution having a basic normality of from about 0.1 to about 0.5.

2. The absorbent solution of claim 1 wherein hydroxyl ion is provided by lithium hydroxide.

3. The absorbent solution of claim 2 wherein the $As_2O_3$ is present in solution in an amount greater than 200 mg. per liter of absorbent solution.

4. The absorbent solution of claim 3 wherein the normality of the said lithium bromide solution ranges from about 0.1 to about 0.3.

5. The absorbent solution of claim 4 wherein the $As_2O_3$ is present in an amount from about 200 mg. per liter to about 2,000 mg. per liter of absorbent solution.

6. The absorbent solution of claim 5 wherein the $As_2O_3$ is present in an amount from about 200 mg. per liter to about 700 mg. per liter of solution.